Dec. 16, 1952 G. L. HERVERT 2,622,113
PRODUCTION OF LONG CHAIN OLEFINIC HYDROCARBONS BY POLYMERIZATION
Filed March 31, 1948
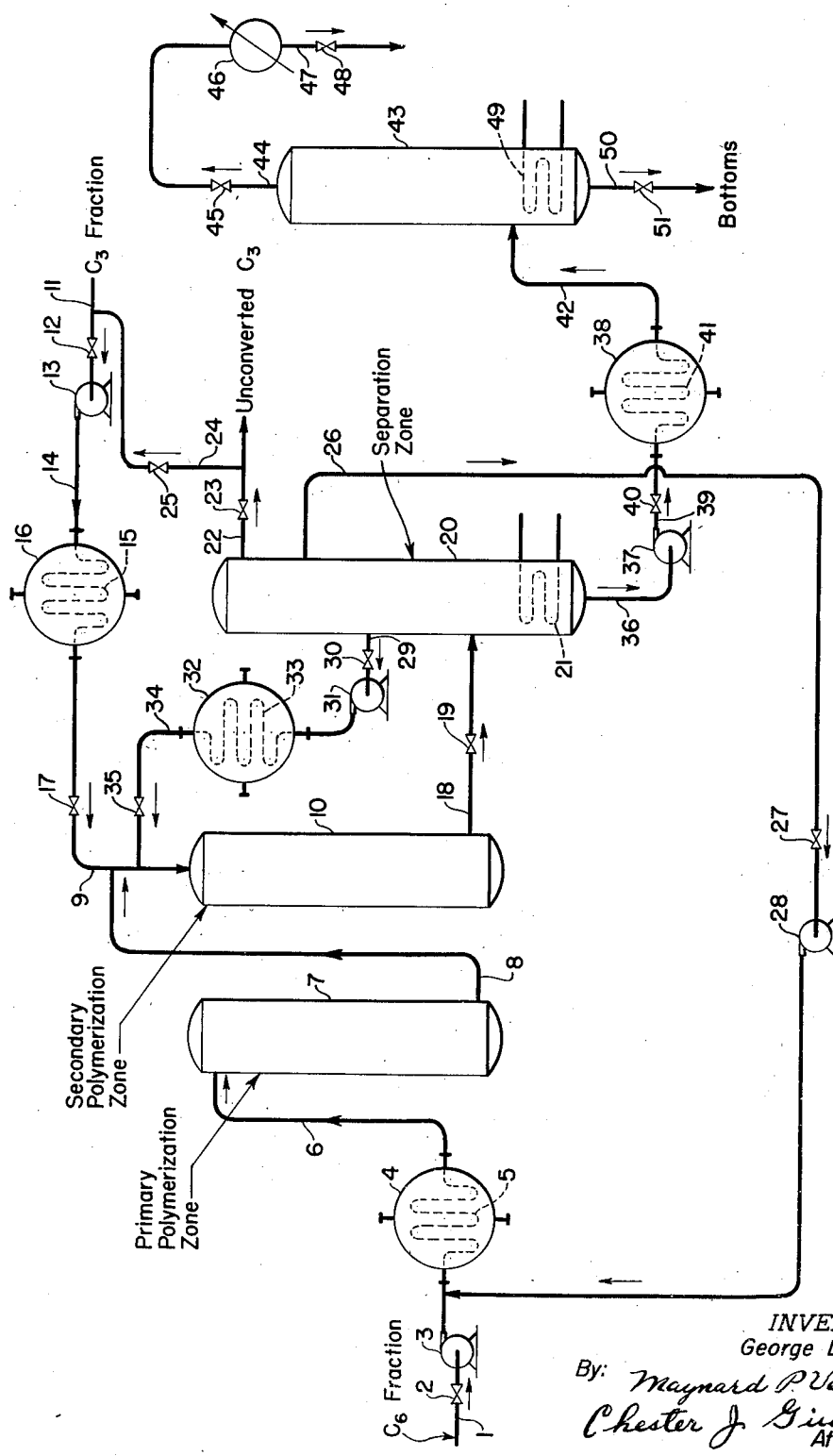
INVENTOR:
George L. Hervert
By: Maynard P Venema
Chester J Giuliani
Attorneys Patented Dec. 16, 1952

2,622,113

UNITED STATES PATENT OFFICE 2,622,113

PRODUCTION OF LONG CHAIN OLEFINIC HYDROCARBONS BY POLYMERIZATION

George L. Hervert, Berwyn, Ill., assignor to Universal Oil Products Company, Chicago, Ill., a corporation of Delaware Application March 31, 1948, Serial No. 18,180

4 Claims. (Cl. 260—683.15)

This invention relates to a process for the production of olefinic hydrocarbons containing from about 12 to about 15 carbon atoms per molecule of relatively straight chain structure by the polymerization of lower molecular weight hydrocarbons utilizing a specific procedure whereby the production of the desired olefinic hydrocarbon product is enhanced and certain operational advantages are obtained. More specifically, the invention concerns an improved method of producing olefinic hydrocarbons of the above structure and molecular weight which are particularly useful as alkylating agents to form alkyl aromatic hydrocarbon intermediates in the manufacture of the corresponding sulfonic acid and sulfonate derivatives thereof possessing particularly valuable properties for deterging purposes and for lowering the surface tension of water in which the sulfate or sulfonate salts are dissolved.

The present method of operation provides a polymerization process involving at least two stages in which an olefinic hydrocarbon fraction comprising principally $C_6$ olefinic hydrocarbons is polymerized in the first stage at reaction conditions suitable for optimum conversion to the $C_6$ dimer and the product thereof, including unconverted $C_6$ charging stock, together with added propylene, is charged into a second stage polymerization reactor wherein olefinic polymers containing from about 6 to about 15 carbon atoms per molecule are produced. The polymerization product of the secondary reactor is thereafter separated into various fractions, the $C_6$ fraction being recycled to the primary reactor, the $C_9$ polymers to the secondary reactor and the desired polymers of from about $C_{12}$ to about $C_{15}$ chain length removed as a separate fraction for conversion into detergents of either the aralkyl sulfonate or of the alkyl sulfate or sulfonate types.

In accordance with a more specific embodiment thereof, the present invention comprises polymerizing in a primary stage of the process, an olefinic hydrocarbon fraction containing predominantly $C_6$ olefins in the presence of a solid phosphoric acid cataylst at a temperature of from about 200 to about 300° C., at a superatmospheric pressure up to about 1000 pounds per square inch and at a charging rate corresponding to a liquid hourly space velocity of from about 0.3 to about 2.0 volumes of monomer per volume of catalyst per hour, passing the product thereof, including liquid polymers, and a $C_3$ hydrocarbon fraction containing propylene into a secondary polymerization reactor containing a solid phosphoric acid catalyst maintained at a temperature of from about 200 to about 300° C., at a superatmospheric pressure up to about 1000 pounds per square inch and at a liquid hourly space velocity of combined feed of from about 1 to about 3 equivalent volumes of liquid feed per volume of catalyst per hour, fractionating the product of said secondary polymerization reaction, removing unconverted $C_3$ hydrocarbons, recycling a fraction comprising $C_6$ hydrocarbons to the primary polymerization reactor, recycling a fraction containing $C_9$ hydrocarbons to the secondary polymerization reactor, removing a fraction comprising olefin polymers containing from about 12 to about 15 carbon atoms per molecule as the product of the process and withdrawing high boiling polymers having a molecular weight greater than the desired product from the fractionating column as a bottoms by-product.

Other specific embodiments relating to particular methods of operation, to alternative catalytic agents and to other factors involved in the present process will be hereinafter referred to in greater detail in the following further description of the invention.

One of the principal difficulties characterizing the presently known methods for polymerizing olefinic hydrocarbons in the presence of a solid polymerization catalyst to form high molecular weight polymers such as trimer, tetramer and pentamer of the olefin monomer charging stock is the progressive deactivation of the solid cataylst during the operation of the process by deposition on the surface of the catalyst particles of high molecular weight polymeric resin-like substances which tend to fill the porous structure of the catalyst and, in effect, prevent contact of the monomer with the active polymerizing centers present in the polymerization catalyst. This characteristic gradual reduction in the activity of solid polymerization catalysts, which is accompanied by a tendency for the yield to drop off becomes more apparent as the length of the polymerization cycle is extended. As recognized by the art, the deactivated catalyst may in some instances be restored, at least partially, to its original activity by discontinuing the polymerization reaction, flushing the residual volatile hydrocarbons from the reactor and passing oxygen or air over or through the bed of catalyst at a temperature sufficient to oxidize the carbonaceous deposits from the catalyst. Following the regeneration of the catalyst in this manner, it is usually necessary to dehydrate the catalyst to its former hydrated condition, representing the condition of optimum activity. Obviously, such methods entail a loss in economy of the process not only from the standpoint of discontinuing the production of polymer from the reactor undergoing regeneration, and the gradual destruction of the structure of the catalyst particles, but also the further expense of providing equipment and labor for effecting the regeneration. In accordance with the principals of the present invention, and as a primary objective thereof, the deactivating, high polymeric substances normally depositing on the surface of the solid polymerization catalyst are continuously removed such that at no time during the polymerization cycle is there a reduction in activity of the catalyst by reason of the deposition of the deactivating material on the surface thereof. The latter highly advantageous result is achieved by effecting polymerization of one type of monomer charging stock in a primary stage of the process to form a portion of the total product consisting of $C_{12}$ to about $C_{15}$ polymers and other higher molecular weight polymers and thereafter charging the total effluent of the primary polymerization reactor, including said polymers which are liquid at the operating temperatures and pressures, into a secondary polymerization reactor into which propylene as a portion of the charging stock thereto is also charged. Polymerization of the olefinic monomers and polymers is obtained in the secondary reactor as the liquid polymer of the primary reaction flows over the solid polymerization catalyst, thus continuously removing by dissolution therein the catalyst deactivating substances which would normally form and accumulate on the catalyst in the absence of the washing effect of the liquid polymers.

Additional advantages of the present method of operation are that relatively straight chain polymers, especially desirable in the production of detergents, are produced thereby. It has been shown that olefins of straight chain configuration are preferred not only in producing detergents of the aralkyl sulfonate type in which the olefin polymer forms the alkyl side chain attached to the aromatic nucleus, but also of the alkyl sulfonate and sulfate types, the straight chain structure of the hydrocarbon portion of the detergent molecule providing detergents of optimum surface activity and solubility in water. The production of straight chain polymers in accordance with the present method of operation is enhanced by virtue of the dimerization of the $C_6$ olefinic charge in the primary stage of the process whereby a product is obtained which contains relatively few branched chain dimers. In addition to the above advantages, the $C_6$ polymers formed as one of the ultimate products of the secondary polymerization reactor by dimerization of propylene may be separated from the total effluent product thereof and charged directly to the primary polymerization reactor where they polymerize to enhance the yield of $C_{12}$ to $C_{15}$ polymers. The two polymerization reactors, therefore, are mutually co-acting, and the product of one reactor supplements the charging stock to the other reactor.

The olefinic monomer charging stock to the primary polymerization reactor of the present process preferably comprises hexylenes, such as the mixture of olefins contained in a $C_6$ fraction of a thermally cracked petroleum product boiling within the temperature range of from about 55° to about 90° C. Such a fraction may also contain some amylenes and heptenes, and their presence therein will not markedly affect the results obtained, although the latter olefins should be present preferably in minor proportions. Pure $C_6$ olefins may be utilized, and of the various $C_6$ isomers, n-hexene-1 is preferred in that it produces a product on dimerization which contains few if any side chain alkyl groups. As provided herein, a portion of the charging stock to the primary reactor may consist of the $C_6$ olefins separated from the effluent of the secondary polymerization reactor, the latter being directly diverted to the primary reactor from the fractionator utilized in separating the mixture of hydrocarbon products of the secondary reactor. As selected conditions of operation, a larger yield of $C_6$ propylene polymer may be obtained from the secondary reactor and the latter utilized as the entire charging stock to the primary polymerization reactor.

The $C_3$ charging stock to the secondary polymerization reactor is preferably predominantly propylene, although a $C_3$ fraction in which propylene is diluted with from about 10 to about 70% of propane is desirable to maintain the temperature of the polymerization zone within controllable limits by virtue of the dilution effect of propane in admixture with propylene. A suitable $C_3$ charging stock may thus comprise the demethanized and deethanized gaseous product of a petroleum conversion reaction such as a thermal cracking operation in which the propylene content usually varies from about 10 to about 70% of the total fraction. Minor amounts of $C_4$ hydrocarbons may be tolerated in admixture with the $C_3$ hydrocarbons, but it is preferred to maintain their concentration in the charging stock at a low value. It is also desirable to fix the water content of both the $C_6$ and $C_3$ olefinic hydrocarbon feed stocks below about 0.5% and generally above 0% to maintain the catalyst in the proper degree of hydration, especially when utilizing the solid phosphoric acid catalyst in the primary and/or secondary polymerization reactors, the acid being preferably maintained in the pyrophosphoric acid degree of hydration.

The polymerization reactors herein provided are preferably catalytic and the desired catalysts utilizable to effect polymerization are characterized broadly as "solid" catalysts. The catalyst particles in the present operation are generally maintained in the reactor as a stationary bed, however, it is also within the scope of the invention to introduce the catalyst in the form of finely divided particles with the gaseous charging stock into the polymerization reactor at a relatively high velocity such that the particles remain suspended within the gaseous charge, the latter type of operation being generally known to the art as the fluidized method of contacting the charging stock and catalyst.

Among the solid polymerization catalysts utilizable in either the primary and/or secondary reactors of the present process are included the pyrophosphoric acid salts of the metallic elements in the right hand columns of groups I and II of the periodic table, particularly of the metals zinc, cadmium, copper and mercury, the salts being desirably deposited upon carrying or spacing materials such as silica gel particles, alumina, firebrick, kieselguhr, etc. Other utilizable catalysts, particularly for fixed or moving bed polymerization operations, comprise the refractory oxides of metals of group IV of the periodic table, composited with or deposited on silica and/or alumina. Typical of the latter catalysts are the silica-zirconia composites, with or without added alumina containing from about 10 to about 15% of zirconia and/or alumina. A particularly preferred solid polymerization catalyst is the composite known generally in the art as the "solid phosphoric acid catalyst" consisting of a pre-calcined mixture of a suitable phosphoric acid, such as pyrophosphoric acid, and a siliceous adsorbent such as kieselguhr, silica spheres, etc., the preparation of which is described in U. S. Patent No. 1,993,513 and others. The latter composite of a siliceous material and a phosphoric acid is sometimes also referred to in the art as a silico-phosphate composition. Of the above generally broad group of solid polymerization catalysts, the so-called solid phosphoric acid catalyst and the catalytic pyrophosphate salts are preferred herein, the two types being referred to in the present application as phosphate-containing catalysts.

The reaction conditions maintained in the primary and secondary stages are, in general, similar except that the charging rate of the olefinic feed into the secondary polymerization reactor is maintained at a somewhat higher value, based on the liquid hourly space velocity unit. The higher charging rate is occasioned by the necessity for accommodating not only the entire effluent from the primary polymerization zone but also the additional propylene-containing charge introduced into the reactor. Furthermore, polymerization zone to trimers, tetramers and pentamers is generally enhanced at the higher charging rate such that the yield of the desired polymers (containing from about 12 to about 15 carbon atoms per molecule) is increased in relation to higher boiling polymers when the relatively high charging rates provided herein are utilized. The conversion temperature maintained in both the primary and secondary polymerization zones is generally within the range of from about 200 to about 300° C. although the latter temperatures may be increased somewhat above the specified range when higher space velocities are utilized. Pressures maintained in both the primary and secondary polymerization zones are desirably superatmospheric, up to about 1000 pounds per square inch, the preferred range being from about 300 to about 800 pounds per square inch gage. At the above temperature and pressure conditions the liquid hourly space velocity of $C_6$ monomer olefinic charging stock into the primary polymerization zone is desirably maintained at from about 0.3 to about 2 volumes of said $C_6$ monomers per volume of catalyst per hour, the volume being calculated on the basis of liquid monomer. The charging rate into the secondary polymerization zone is maintained at a liquid hourly space velocity of from about 1 to about 3 equivalent volumes of liquid feed per volume of catalyst per hour to obtain optimum conversion of the monomer charging stock, where the charging stock consists of the combined propylene-containing normally gaseous fraction and the reactor effluent of the primary polymerization zone, at least a portion of which is liquid at the operating conditions of the secondary polymerization zone.

The operation of the process comprising the present invention is further illustrated in connection with the accompanying drawing which indicates a general, simplified arrangement of reactors and other apparatus for operation of the process.

Referring to the diagram, an olefinic hydrocarbon fraction containing predominantly $C_6$ olefins, for example, a gasoline fraction of a thermally cracked petroleum product boiling from about 55 to about 90° C. is charged into the process through line 1, valve 2 and increased to a superatmospheric pressure up to about 1000 pounds per square inch by compressor 3 which discharges the compressed $C_6$ fraction into heat exchanger 4 containing heat absorbing coils 5 wherein the fraction is increased to a temperature of from about 200 to about 300° C. The $C_6$ olefinic fraction maintained at the above conditions is removed from heat exchanger 4 through line 6 and is directed into primary polymerization zone 7 containing a solid polymerization catalyst, being charged therein at a rate corresponding to a liquid hourly space velocity of from about 0.3 to about 2 volumes of liquid $C_6$ fraction per volume of catalyst per hour, maintained at this optimum rate by valve 2 controlling the flow into the process. The charge is ordinarily introduced into the top of polymerization reactor 7, allowed to flow downwardly through the bed of solid catalyst particles, and discharged from the reactor after the desired residence time therein in contact with the catalyst. The conversion products comprising liquid polymer and unconverted $C_6$ hydrocarbons are discharged from the bottom of reactor 7 through line 8, which connects with line 9 conveying the various components of the charging stock into secondary polymerization zone 10.

A predominantly $C_3$ hydrocarbon fraction containing propylene which comprises one of the components in the charging stock to polymerization reactor 10 is introduced through line 11 in amounts controlled by valve 12 and is increased to the desired pressure, not exceeding about 1000 pounds per square inch, by compressor 13. The compressed $C_3$ hydrocarbon fraction is conveyed by line 14 into heat exchanger 16 containing heat exchange coil 15 wherein the hydrocarbon fraction is increased to its optimum desired temperature and is then discharged from heating coil 15 into line 9 through valve 17 and is admixed with the reaction effluent of primary polymerization zone 7 by interconnection of line 9 with line 8. The propylene-containing fraction introduced into the process through line 11 may be heated to a temperature higher than the ultimate required conversion temperature for secondary polymerization zone 10 where it is necessary to increase the temperature of the predominantly liquid product value of primary polymerization zone 7 which is admixed with said propylene-containing fraction prior to its introduction into reaction zone 10. Thus, in order to attain the desired conversion temperature of from about 200 to about 300° C. for secondary polymerization zone 10, the $C_3$ hydrocarbon fraction containing propylene may be heated to a temperature somewhat above this range to obtain the desired temperature of the mixture. The combined hydrocarbon streams are charged into zone 10 at a combined feed rate in terms of liquid hourly space velocity of from about 1 to about 3 volumes of liquid feed per volume of catalyst per hour.

The catalyst maintained in zone 10 is a solid catalyst such as the solid phosphoric acid composite hereinabove referred to and may be maintained in reactor 10 as a fixed bed over which the combined olefinic hydrocarbons flow to the outlet of the reactor. The reactor outlet is generally at the bottom thereof when the charge is introduced into the upper portion of reaction zone 10. The product is withdrawn from zone 10 through line 18 containing valve 19 and is discharged into separation zone 20 which usually comprises a packed or bubble cap fractionating zone having a reboiler section such as heating coils 21 in the lower portion thereof to effect the necessary vaporization of the liquid bottoms accumulating in said zone 20. Fractionation in zone 20 effects the separation of a normally gaseous fraction containing unconverted $C_3$ hydrocarbons. The latter gaseous fraction may be withdrawn through conduit 22 containing valve 23 from which it may be discharged from the process, or alternatively, recycled into the process flow through alternate line 24, and discharged into line 11 in controlled amounts determined by valve 25. The unconverted $C_3$ fraction, usually richer in propane than the initial $C_3$ charging stock, may be admixed with said charging stock to dilute the concentration of propylene and thus maintain the rate and temperature of polymerization in secondary polymerization zone 10.

A somewhat higher boiling fraction containing $C_6$ olefins may be separated from the products of the secondary polymerization reaction by removal of said fraction at its appropriate boiling point from zone 20 through line 26, containing valve 27, and compressed at least to the pressure existing in zone 7 by means of pump 28 for recycling to the primary polymerization reactor, said zone 7. For recycling purposes, the $C_6$ fraction in line 26 is discharged into line 1 and treated thenceforth as the charging stock to said zone 7.

A fraction containing $C_9$ hydrocarbons may be separated in zone 20 and removed therefrom through line 29 containing valve 30 by pump 31 which directs the liquid hydrocarbons contained in said fraction through heat exchanger 32 containing heat exchange coil 33 wherein the $C_9$ hydrocarbons are increased in temperature to the optimum desired for conversion in secondary polymerization zone 10. The fraction at the desired temperature and pressure is discharged from heating coil 33 in heat exchanger 32 into line 34 containing valve 35 and is admixed with the charging stock to zone 10 by connection of line 34 with line 9.

The bottoms fraction which is allowed to accumulate in separation zone 20 contains higher boiling polymers than $C_9$ from which the desired product is separated in a subsequent fractionation zone. The bottoms fraction from zone 20 is removed from said zone through line 36 by means of pump 37 and is directed into heat exchanger 38 via line 39, containing valve 40 where the higher boiling polymers contained in the bottoms product are heated to a temperature sufficient to vaporize the $C_{12}$-$C_{15}$ polymers therefrom in the subsequent fractionation zone. Heat exchange into the hydrocarbon polymers is obtained by passage of the hydrocarbons through heat exchange coils such as coil 41 in furnace 38. The hydrocarbon mixture, at the required temperature, is discharged therefrom through line 42 into fractionating column 43 where the desired $C_{12}$-$C_{15}$ fraction is allowed to flash off from the remaining higher boiling polymers. The vaporized fraction is removed from fractionator 43 through line 44 containing valve 45 into condenser 46 and withdrawn from the process through line 47 and valve 48. The latter desired $C_{12}$-$C_{15}$ olefinic hydrocarbons boil from a temperature of from about 170 to about 245° C. and to effect their vaporization, fractionating zones 43 may be maintained at subatmospheric pressure to lower the boiling point of the fraction. Reboiling of the liquid bottoms fraction containing polymers of higher molecular weight than the desired $C_{15}$ olefinic hydrocarbons is obtained in the bottom of fractionating column 43 by reboiler coil 49. The high boiling bottom polymers are removed from column 43 through line 50 containing valve 51 and are discharged from the process or diverted to a hydrocarbon cracking process to convert the hydrocarbons into lower molecular weight olefins selected fractions of which may be charged to the process at the appropriate points.

Instead of maintaining primary and secondary polymerization zones as two separate reactors, the latter may be combined as a single reactor containing the solid catalyst. Under such an arrangement in which the primary and secondary polymerization zones may be considered as being connected in series as a single continuous reactor, the olefinic monomer fraction containing predominantly $C_6$ hydrocarbons is introduced into the top and allowed to flow downwardly through the particles of solid polymerization catalyst and the gaseous hydrocarbon fraction containing propylene is introduced at a point intermediate the top and bottom of the catalyst bed and allowed to join the downwardly flowing stream into the bottom of the reactor. Thus, under such an arrangement, liquid polymers are formed in the upper portion of the polymerization zone by dimerization of the $C_6$ hydrocarbon monomers and the latter dimers in liquid state flow downwardly through the catalyst bed and contact the propylene-containing charging stock which also flows downwardly in contact with the catalyst particles. The entire reaction product is thus removed from the bottom of the single polymerization unit and charged to a separation zone as hereinabove provided for the dual reactor system.

As heretofore specified, the product of the present invention comprising $C_{12}$ to $C_{15}$ olefinic hydrocarbons is especially valuable in the production of detergents, either by conversion of the polymer fraction to an alcohol and sulfation of the resulting alcohol to form the detergent intermediate, by sulfonation of the olefin directly and neutralization of the resulting sulfonic acid to form an alkyl sulfonate type of detergent or by utilizing the olefin polymers to alkylate an aromatic hydrocarbon, preferably of benzenoid series, such as toluene, which alkylate is then sulfonated to form the corresponding sulfonic acid and neutralized to produce an aralkyl sulfonate type of detergent.

The invention is more particularly described by reference to the following example which illustrates the process in relation to specific embodiments thereof; the example is therefore not to be construed as limiting the present invention in any of its broad aspects.

*Example*

In a continuous process for the production of an olefinic hydrocarbon fraction suitable for alkylating an aromatic hydrocarbon from which alkylate a detergent was subsequently prepared, a predominantly $C_6$ hydrocarbon fraction was dimerized and the product thereof mixed with a predominantly $C_3$ hydrocarbon fraction and subjected to polymerization in accordance with the following process.

A fraction boiling from about 70° to about 90° C., separated from the gasoline product of a thermal cracking process and having a bromine number of 93 was charged at a liquid hourly space velocity of 0.33 volume per volume of catalyst per hour into a polymerization reactor containing solid phosphoric acid catalyst pellets at a temperature of 256° C. and at a pressure of 800 pounds per square inch gage. 16.4% of the product boiled from about 168° to about 229° C. and the bromine number of the fraction had an average value of about 127. 68.2% of the product boiled below about 168° C. and the remainder boiled above about 229° C.

The entire product of the above reaction was admixed with a propylene-containing fraction having the following composition, separated from the normally gaseous effluent of a thermal cracking process.

Composition, mol per cent:

| | |
|---|---|
| $C_1$–$C_2$ | 0.3 |
| $C_3H_6$ | 19.6 |
| $C_3H_8$ | 78.4 |
| $C_4H_8$ | 1.1 |
| $C_4H_{10}$ | 0.4 |
| $C_5$ plus | 0.2 |
| | 100.0 |

The charging stock, 23 weight percent of which comprised the $C_6$ dimer product of the initial polymerization reaction, in a partially liquid state was heated to a temperature of 230° C. and charged at a liquid hourly space velocity of approximately 1.2 and at a pressure of 600 lbs. per square inch gage into a polymerization reactor containing a stationary bed of solid phosphoric acid catalyst pellets. The product was fractionated into an unconverted $C_3$ gaseous hydrocarbon fraction (62 weight percent of the product), a $C_6$ fraction (8.2 weight percent of the product), a $C_9$ fraction (5.3 weight percent of the product), a $C_{12}$ to $C_{15}$ fraction (boiling point of from about 170° to about 225° C. comprising about 17.4 weight percent of the product) and a higher boiling bottoms fraction.

The $C_{12}$ to $C_{15}$ fraction was utilized to alkylate toluene to form an alkylaromatic hydrocarbon which was then sulfonated and the sulfonic acid product neutralized. The dried aralkylsulfonate salt when admixed with approximately 2 weight proportions of sodium sulfate produced a highly effective detergent having cleansing properties exceeding a fatty acid soap in equivalent aqueous concentrations.

I claim as my invention:

1. A process for the production of olefinic hydrocarbons containing from about 12 to about 15 carbon atoms per molecule which comprises subjecting a monomeric olefinic hydrocarbon fraction containing predominantly $C_6$ olefinic monomers to a primary polymerization reaction in the presence of a solid polymerization catalyst, admixing the olefinic reaction products of the primary reaction, some of which are liquid at the operating conditions, with a predominantly $C_3$ hydrocarbon fraction containing propylene, subjecting said olefinic hydrocarbon mixture to a secondary polymerization reaction in the presence of a solid polymerization catalyst, separating from the reaction products of the secondary reaction said olefinic hydrocarbons containing from about 12 to about 15 carbon atoms per molecule, a fraction comprising $C_6$ hydrocarbons and a fraction comprising $C_9$ hydrocarbons, directing said fraction comprising $C_6$ hydrocarbons to said primary polymerization reaction and recycling said fraction comprising $C_9$ hydrocarbons to said secondary polymerization reaction.

2. The process of claim 1 further characterized in that said solid polymerization catalyst is a phosphate containing catalyst.

3. The process of claim 1 further characterized in that said solenoid polymerization catalyst is a calcined composite of a phosphoric acid and a siliceous adsorbent.

4. The process of claim 1 further characterized in that said primary polymerization reaction is effected at a temperature of from about 200 to about 300° C., at a superatmospheric pressure up to about 1000 pounds per square inch and utilizing a charging rate of from about 0.3 to about 2 volumes of liquid monomer per volume of catalyst per hour and said secondary polymerization reaction is effected at a temperature of from about 200 to about 300° C., at a superatmospheric pressure up to about 1000 pounds per square inch and utilizing a charging rate of from about 1 to about 3 volumes of liquid feed per volume of catalyst per hour.

GEORGE L. HERVERT.

REFERENCES CITED

The following references are of record in the file of this patent:

UNITED STATES PATENTS

| Number | Name | Date |
|---|---|---|
| 2,318,719 | Schneider et al. | May 11, 1943 |
| 2,332,298 | Clarke et al. | Oct. 19, 1943 |
| 2,381,198 | Bailey et al. | Aug. 7, 1945 |
| 2,404,340 | Zimmerman | July 16, 1946 |
| 2,446,947 | Munday et al. | Aug. 10, 1948 |
| 2,457,146 | Grote et al. | Dec. 28, 1948 |
| 2,470,904 | Shanley | May 24, 1949 |
| 2,486,533 | Mayland et al. | Nov. 1, 1949 |
| 2,500,307 | Brooke et al. | Mar. 14, 1950 |